United States Patent [19]

Skinner

[11] Patent Number: 4,488,776

[45] Date of Patent: Dec. 18, 1984

[54] PLASTIC LENS CELL

[75] Inventor: James R. Skinner, Saratoga, Calif.

[73] Assignee: M.U. Engineering & Manufacturing Inc., Mountain View, Calif.

[21] Appl. No.: 429,041

[22] Filed: Sep. 30, 1982

[51] Int. Cl.³ .............................................. G02B 7/02
[52] U.S. Cl. ..................................... 350/242; 350/252
[58] Field of Search .................. 350/242, 450, 252

[56] References Cited

U.S. PATENT DOCUMENTS

| 3,402,003 | 9/1968 | McFarland | 350/252 |
| 3,828,991 | 8/1974 | Moore | 350/252 X |
| 4,258,982 | 3/1981 | Skinner et al. | 350/252 |

FOREIGN PATENT DOCUMENTS 297871  4/1954  Switzerland ...................... 350/450

Primary Examiner—John K. Corbin
Assistant Examiner—Lynn Vandenburgh Kent
Attorney, Agent, or Firm—Jackson, Jones & Price

[57] ABSTRACT

An improved lens cell is provided wherein a pair of identical housing elements cooperate with an aperture member that has a surface configuration to both space and center lens elements that are retained within the housing elements.

18 Claims, 4 Drawing Figures

PLASTIC LENS CELL

BACKGROUND OF THE INVENTION

1. Field of the Invention

The present invention is directed to a lens cell or lens barrel for receiving a plurality of lens elements, and more particularly to an improved lens cell of a simplified construction that ensures a precise alignment and stress-free positioning of lens elements.

2. Description of the Prior Art

The advent of plastic precision molding has permitted the optical field to create plastic lens elements that have not been heretofore possible with conventional glass lens elements. The prior art has adopted and is using plastic lens barrels or lens cells for both plastic lens elements and glass lens elements. An example of such a lens cell can be seen in U.S. Pat. No. 4,258,982.

The state of the art in the plastic molding of lens elements and lens cells has permitted a sufficiently precise registration of the lens elements at set optical distances to provide an economical optical system. In achieving such registrations, it has been known to mold integral flange members on the lens elements to act as spacing elements for the positioning of the lens elements within the cell body. However, the competitive cost of producing economical lens systems has still created an unsatisfied demand in the prior art for new and innovative lens cells.

SUMMARY OF THE INVENTION

The present invention is directed to a lens cell in combination with specific lens elements that are preferably manufactured from a plastic material. The lens cell can simply consist of two identical housing elements that can be economically manufactured from the same die mold. The housing elements can be positioned opposite each other and then, by a counter rotation about their axes, they are permitted, through their connecting portions, to be joined together. A separate aperture member of a dimensional size capable of being fitted within the housing elements has a molded surface configuration to both space and center the lens elements as the respective housing elements are operatively joined together.

The present invention is capable of providing both centration and spacing of all lens elements with the aperture member while the housing elements principally retain the lens elements in operative contact with the aperture member, as can be appreciated by a person skilled in this field. The number of production parts for assembly has been minimized.

In the preferred embodiment, a four lens element symmetrical aspheric copying lens system having a focal length of 168 millimeters and a speed of f/5.6 is disclosed. Additional features such as stray light suppression ridges on both the aperture member and the housing elements and the specific complementary configurations of an annular flange on the aperture member with peripheral flanges on the lens elements are more specifically described herein.

The features of the present invention, which are believed to be novel, are set forth with particularity in the appended claims. The present invention, both as to its organization and manner of operation, together with further objects and advantages thereof, may best be understood by reference to the following description, taken in conjunction with the accompanying drawings.

DESCRIPTION OF THE PREFERRED EMBODIMENT

The following description is provided to enable any person skilled in the optical field to make and use the invention and sets forth the best modes contemplated by the inventor of carrying out his invention. Various modifications, however, will remain readily apparent to those skilled in the art, since the generic principles of the present invention have been defined herein specifically to provide a relatively economical and easily manufactured copier lens housing cell and lens elements.

Figure 1:
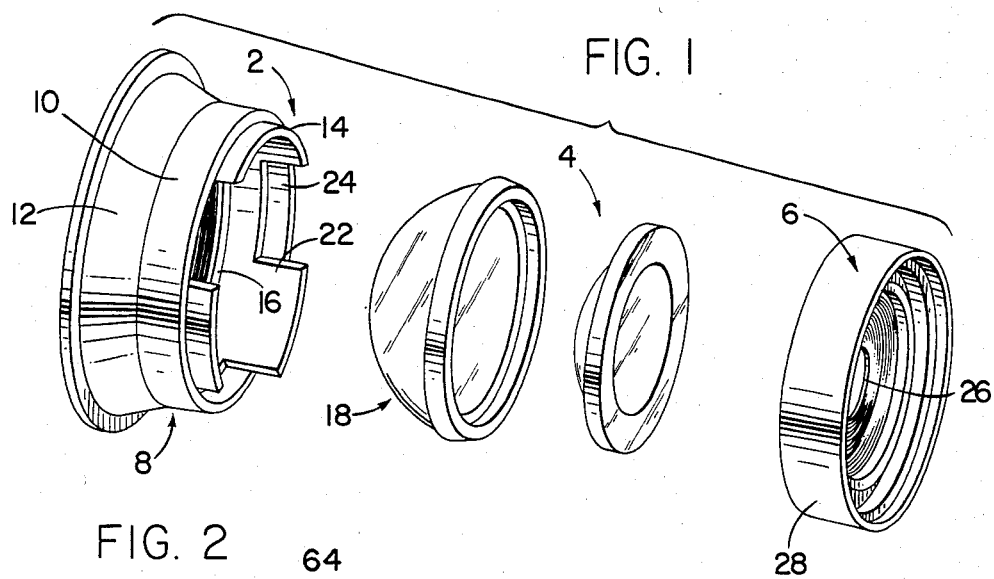
FIG. 1 is an isometric view of a portion of a lens system of the present invention.

Referring to FIG. 1, a perspective view of a portion of the present invention lens cell 2, optical elements 4 and aperture member 6 is disclosed. A cell housing element 8 includes a body portion 10 connected at one end to a hood element 12 and at the other end to a connecting portion 14. A retention ring 16 is integrally molded into the interior of the housing element 8 to provide a precise position for a first or outer lens element 18. Appropriate stray light suppressing features 64 can also be positioned on the internal conical configuration of the hood elements 12. As will be appreciated hereinafter, the housing element 8 has been specially designed for operative connection with an identical housing element 20, and in the preferred embodiment, a symmetrical lens system is disclosed wherein a pair of identical lens elements are mounted on either side of the aperture member 6.

The connecting portion 14 can be broadly described as having a castellated feature wherein three prongs 22 extend forward from a smooth interior cylindrical surface of each housing member. Complementary step or shoulder portions 24 are positioned equidistant between the connecting portion 14 and are of such a dimension to be slightly circumferentially larger than the complementarily prong members 22. A relative rotation of the respective housing elements 8 and 20 by approximately 60° and an axial juxtaposition movement of these respective housing elements provides an operative matching of their identical connecting portions, that is, prong to shoulder portions are matched in an assembling operation.

Advantageously, the housing elements 8 and 20, the aperture member 6 and the optical elements are all manufactured from plastic. For example, the housing elements and the aperture member can be manufactured from any suitable material such as phenylene oxide which is black in color and can be 20% glassfilled. The lens elements can be manufactured from an acrylic, styrene, polycarbonate or other suitable optical material. Additionally, one or more surfaces of the lens members can be subjectively configured so that, for example, in the preferred copier lens embodiment aspheric lens elements cooperate to provide a f/5.6 speed.

Figure 2:
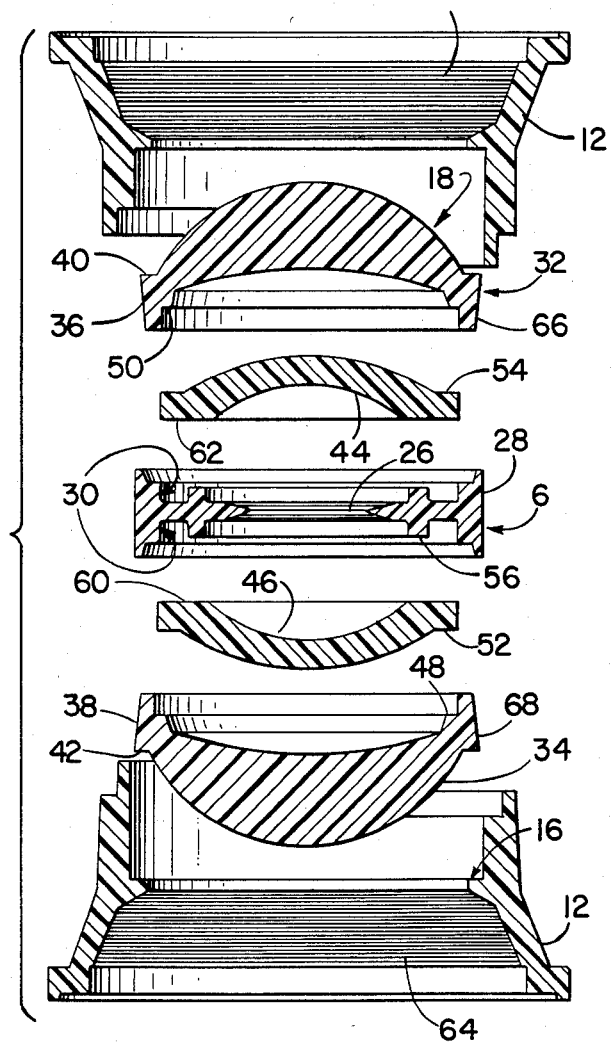
FIG. 2 is an exploded cross-sectional view of the present invention in the orientation in which it is to be assembled on a production line.
Figure 3:
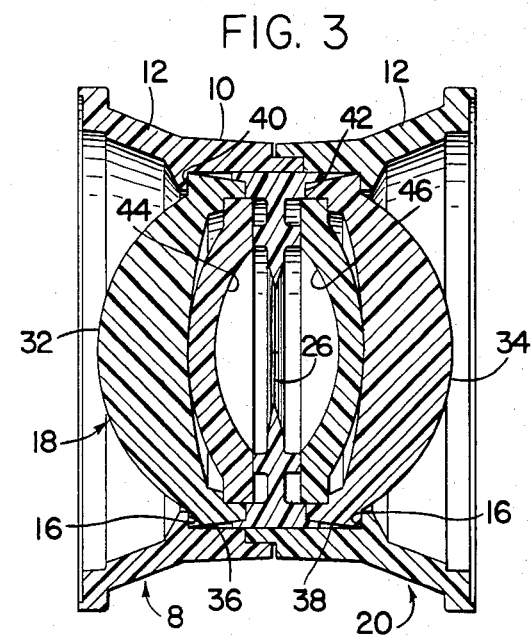
FIG. 3 is a side schematic cross-sectional view of the present invention assembled.
Figure 4:
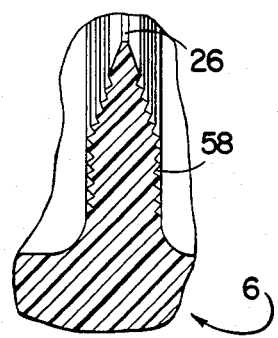
FIG. 4 is an enlarged view of a portion of the aperture member.

The aperture member 6 is also manufactured from a plastic, for example, of the same type of plastic as the housing elements 8 and 20. The aperture member 6 has an exterior ring-like configuration and is of a dimensional size that can be fitted within the housing elements and positioned between the lens elements. The aperture member 6 has been specifically designed to have a surface configuration to define the axial spacing and centration of the lens elements as respective housing elements 8 and 20 are operatively joined together by their connecting portions 14. The aperture member 6 comprises essentially a pair of concentric rings that surround an aperture opening 26. The first or outer ring is an annular flange 28 having an axial width or dimension that is capable of extending beyond the connecting portions of the housing elements 8 and 20, as can be seen in FIG. 3. This ensures that any ambient light will be blocked from entrance into the lens cell 2. The internal surface or lens alignment surface 30 on either side of the annular flange 28 is beveled or inclined and is complementary to an outer peripheral mounting surface of the exterior lenses 32 and 34. As can be seen in both FIGS. 2 and 3, these positive lens elements 32 and 34 have special peripheral mounting rims 36 and 38 that are integrally molded with each of the respective lens. It should also be appreciated that the outer lens elements 32 and 34 like the interior negative meniscus lenses 44 and 46 are identical and can be economically manufactured from the same die mold. Exterior registration rims 40 and 42 are specifically designed to coact with the respective housing elements retention rings 16 to provide a fixed optical position.

The peripheral diameter of the interior lenses 44 and 46 are also designed to fit within the mounting rims 36 and 38 of the exterior lenses 32 and 34 and to bear directly on interior registration rims 48 and 50. Flat annular surfaces or bearing rings 52 and 54, positioned on the peripheral mounting flanges of the interior lenses 44 and 46, are complementary to the interior registration rims 48 and 50.

The aperture ring 6 includes an internal spacing ring 56 that immediately surrounds the aperture opening 26. Appropriate light suppressant rings 58 are provided between the spacing ring 56 and the aperture opening 26. The spacing ring 56 is designed to bear directly on the flat peripheral rim of the concave side of the respective interior meniscus lens elements.

As can be seen from FIG. 3, the positive load bearing surfaces on just one side of the lens cell comprises respectively the retention ring 16, the exterior registration rim 42 on the mounting flange of the positive meniscus lens element, the interior registration rim 48, the bearing ring 52 of the interior negative meniscus lens element, the flat rim 60, and the spacing ring 56 of the aperture ring 6. These direct bearing contact surfaces repeat themselves on the other side of the aperture ring 6.

Outer inclined peripheral surfaces 66 and 68 of the positive meniscus lens elements are complementary to the interior inclined surfaces 30 of the aperture ring member 6. This design feature ensures that there is an alignment of the lens elements when the housing elements are being moved to their operative position.

Thus, during assembly a positive lens element 34 is inserted into a housing element 12 and a negative meniscus lens element 46 is then nestled within the positive lens element. The aperture ring 6 is then placed over the outer peripheral surface of the negative meniscus lens element flange in such a manner that its internal spacing ring 56 bears directly on the flat rim 60 of the negative meniscus lens element 46. Another negative meniscus lens element 44 is then mounted on the other side of the spacing ring 56 and this in turn is encompassed by an exterior positive lens element 32. Finally, an appropriately rotated housing element 12 is operatively positioned and axially moved so that the respectively connecting portions 14 of the housing elements are interconnected. During this interconnection, the inclined beveled surfaces 30 of the aperture ring 6 and the outer inclined peripheral surfaces 66 and 68 of the negative meniscus lens elements ensure both proper axial spacings and alignment within the respective housing elements.

Thus the actual centration and spacing parameters are defined by a single component, the aperture number 6. The housing elements do not participate in the centration and spacing but rather serve only to retain the respective lens elements in proper contact with the aperture number 6.

The housing elements can be further firmly fixed together by the application of ultrasonic welding as is known the prior art. After this ultrasonic welding, only the housing elements are actually permanently fastened together, since the aperture ring and the respective lens elements have been securely aligned and positioned within the lens cell during the assembling process.

As can be readily appreciated, there is no requirement to utilize any glues or adhesives and it is not necessary that precautions be taken to ensure that such a material will not mar the optical surfaces of the lens elements. Additionally, the manner in which the lens cell is constructed ensures that optical tolerances will be axially maintained, while preventing the introduction of unwanted stress into the lens elements. In the preferred embodiment the housing elements or halves can be ultrasonically shear welded in approximately twelve locations with the aperture number 6 serving the function of centration and spacing during assembly. Such an arrangement serves to minimize the axial distortion of the lens elements.

Various modifications of the above-described invention may be readily apparent to those skilled in the optical field in light of the above-disclosed generic concepts. Therefore, the scope of the present invention should be interpreted solely from the following claims.

What is claimed is:

1. A combination lens cell and lens elements for an optical system comprising:
   a plurality of lens elements for transmitting an image;
   a pair of identical plastic housing elements having respective body portions and connecting portions, the housing elements designed to cooperatively retain the lens elements between and within the housing elements when their respective connecting portions are joined together, and
   an aperture member having a size capable of being fitted within the housing elements between the lens elements, the aperture member also having a surface configuration to provide spacing by contact with at least two of the lens elements when they are operatively positioned by the housing elements, the aperture member includes an annular flange of such an axial width to extend beyond the connecting portions of the housing elements.

2. The invention of claim 1, wherein the lens elements have annular flanges that are self-aligning to assure a proper position on an optical axis during assembly of the housing elements.

3. The invention of claim 2, wherein the aperture member includes stray light suppression rings molded into the aperture member.

4. The invention of claim 2 wherein the annular flange has a complementary surface to the annular flanges of the lens elements to ensure alignment during assembly of the housing elements.

5. The invention of claim 1 wherein four plastic lens elements are provided and the aperture member positions them in a symmetrical position within the lens cell.

6. The invention of claim 5 wherein a pair of identical lens elements are mounted on either side of the aperture member.

7. An improved lens cell capable of supporting a plurality of lens elements for transmitting an image comprising:
   a pair of identical plastic housing elements having complementary mating surfaces when axially rotated from a facing identical alignment position, the housing elements designed to cooperatively retain the lens elements within the housing elements when joined together, and
   a separate aperture member having an annular flange of such an axial width to extend beyond the complementary mating surfaces of the housing elements and to block the entrance of any ambient light when mounted within the housing elements.

8. The invention of claim 7 wherein a lens element has an inclined peripheral surface and the lens cell aperture member has a complementary inclined surface to assist in alignment of the lens element when the housing elements are being moved to their operaive positions.

9. The invention of claim 7 wherein the housing elements include a first peripheral mounting flange.

10. The invention of claim 9 further including a lens element which has a complementary mounting flange shape compatible with the housing element mounting flange.

11. The invention of claim 10 wherein the lens element has a second peripheral mounting flange.

12. The invention of claim 11 wherein a second lens element is mounted against the second peripheral mounting flange and is held in position by a spacing member on the aperture member.

13. The invention of claim 7 wherein a castellated mating surface is provided.

14. The invention of claim 13 wherein the aperture member includes an annular flange of such an axial width to extend beyond the complementary mating surfaces and to block the entrance of any ambient light.

15. The invention of claim 7 wherein the housing elements have been permanently joined together by ultrasonic welding and are the only components permenently fastened together.

16. The invention of claim 7 wherein stray light suppression means are provided on the housing elements.

17. The invention of claim 7 wherein stray light suppression means are provided on the aperture member.

18. An improved lens cell capable of supporting a plurality of lens elements within the lens cell for transmitting an image consisting of:
   a pair of identical plastic housing members, respectively having a conical hood element at one end and a connecting portion at the other end, the connecting portions each having alternating shoulder portions and prong members, the shoulder portions being circumferentially larger than the prong member whereby the connecting portions are joined together by matching the prong members of each housing member with the shoulder portions of the other housing member and providing an axial juxtapositional movement to join the respective housing members together.

* * * * *